Sept. 18, 1934.　　　　B. J. WEST　　　　1,973,939
HYDRAULIC WINDSHIELD CLEANER
Filed March 14, 1932
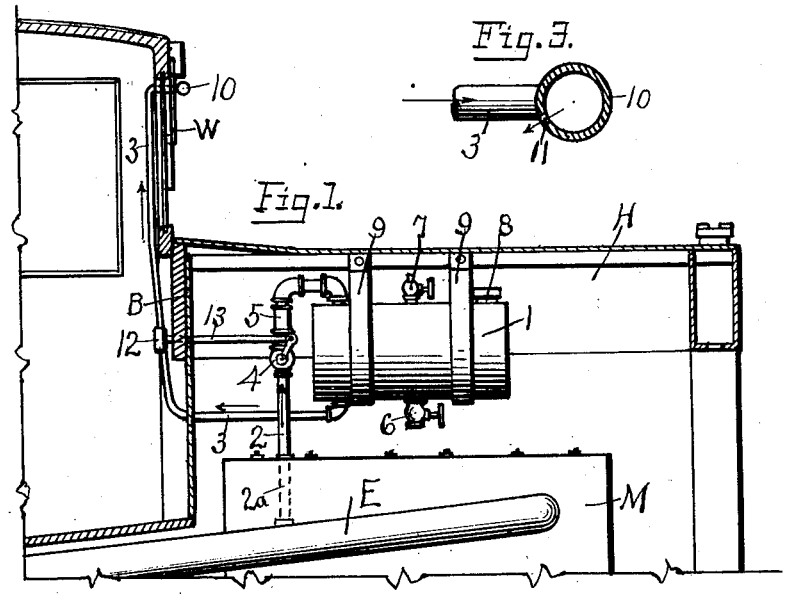
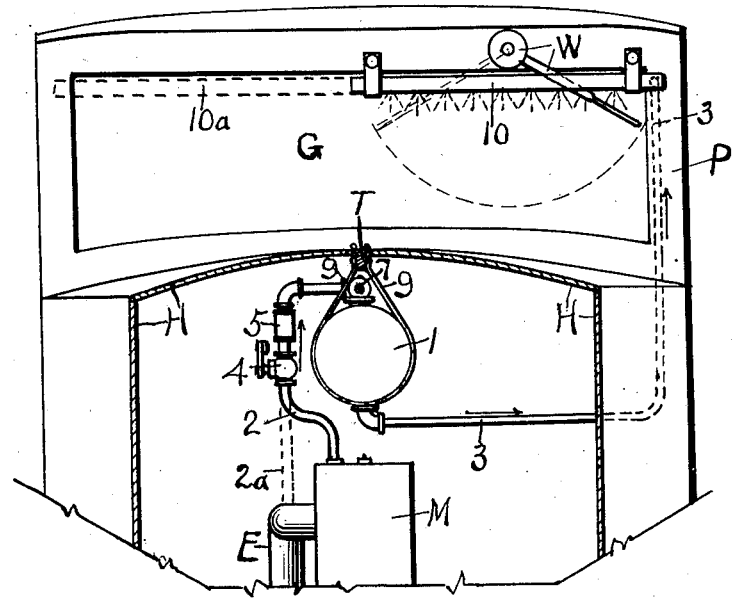
Ben J West, Inventor,
By Geo. W. Bullard, Attorney.

Patented Sept. 18, 1934

1,973,939

UNITED STATES PATENT OFFICE 1,973,939

HYDRAULIC WINDSHIELD CLEANER

Ben J. West, Puyallup, Wash.

Application March 14, 1932, Serial No. 598,765

2 Claims. (Cl. 20—40.5)

This invention relates to cleaning devices for that window of an automobile known as the windshield. It is to be understood that the principle of operation may be used in combination with devices for cleaning windows and windshields of all kinds of motor driven vehicles, such as autotrucks, auto-buses, air planes, electric cars, and also steam locomotives.

The windshields of motor vehicles often become dimmed and soiled with fog, rain, snow, dust, and mud. Bugs, grasshoppers, and other insects are often dashed against the windshield and so soil it that the vision of the driver is more or less obscured. Heretofore windshields have been cleared of these various hindrances by windshield wipers that are pivotally or otherwise mechanically operated. These devices do satisfactory work to some extent, but in the removing of fog, snow, dust, and insects, the windshield glass often becomes so smeared that the vision of the driver is greatly obstructed.

The object of this invention is to provide automatic means to eject sprays of water or other cleaning fluid onto the windshield glass above the present makes of windshield wipers and thus enable the wipers to wash and wipe the glass clean of all obstructing substances so that clear vision is obtained.

Another object of the invention is to utilize the motor exhaust gases to provide the pressure required to discharge and spray the cleaning fluid onto the windshield and means whereby the auto driver can apply this motor exhaust pressure at will whenever the same is required.

I attain these and other objects by means of apparatus illustrated in the accompanying drawing, in which:—

Fig. 1 is a side elevation of the invention shown located within the hood of an automobile, the hood and the front part of the car being shown in lengthwise section; Fig. 2 is a front elevation of the invention and motor, the hood being shown in cross section and the front of the windshield and car being shown in elevation; and Fig. 3 is an enlarged cross section of the tube or pipe designed to eject the cleaning fluid onto the windshield.

The drawing is not made to exact sizes and proportions in the several parts, but is designed to illustrate their combination and operation. Similar parts are indicated by similar characters in each of the several views.

Referring to the drawing it will be seen that the invention comprises a cylindrical tank-like container 1 and having a gas pressure supply tube 2 and a discharge outlet tube 3. This container 1 is preferably located above the motor M within the motor hood H, or elsewhere in the car as conditions and convenience may require.

The tube 2 is to be connected with the explosive chamber of one of the motor cylinders as shown, or in some cars, it may be connected with the motor exhaust pipe E as indicated at 2a. Through it a gas pressure is provided within the container 1. The tube 2 is provided with a control valve 4 above which is a check or one-way valve 5, the latter to prevent a reverse action during the intermittent intake of the motor cylinder. By means of the pressure thus supplied, the cleaning fluid is put under an air cushion that will discharge the same as hereinafter described.

The discharge outlet tube 3 is extended to one side of the auto cab and up its side post P to the top of the windshield where it is connected with an ejector tube or pipe 10 which is fixed in a horizontal position at the top and in front of the windshield glass G. This pipe is provided with a number of small outlets 11 which discharge the cleaning fluid directly onto the windshield glass above the mechanically operated windshield wiper W. The invention thus constructed and installed is put in operation by the pull button 12 shown located on the instrument board B. It may be located elsewhere, if desired and if more suitably convenient. The button 12 is provided with a small shaft 13 extending to and connected with the the control valve 4. On pulling the button 12 the valve 4 is opened and the exhaust gas from the motor M promptly escapes up through the tube 2 and the check valve 5 into the container 1 and instantly puts the fluid therein under sufficient pressure to force the same up the tube 3 and into the ejector pipe 10 and therefrom onto the windshield glass as indicated and described. This supply of cleaning fluid used in co-operation with the windshield wiper W enables the wiper to wash and wipe the windshield glass G clean and clear, and the object for which the invention was designed is thus attained.

It is to be observed that the container 1 is provided with an outlet valve 6 for draining the same when desired. A pet cock 7 set for a suitable vent automatically releases the pressure when the invention is not in use and the fluid in the tube 3 will return to the level of the fluid within the container 1. The container is further provided with a screw cap opening through which the same can be filled when required. The container may be supported in position by any suitable means. It is here shown hung by encircling sheet metal strips 9 attached to the central truss bar T of the motor hood.

I am aware that windshield cleaners by means of spraying the cleaning fluid onto the windshield glass have been devised and used, but none of these have been designed to operate automatically by utilizing the exhaust pressure from the gas motor. The required pressure has been provided entirely by hand operated mechanism in the form of hand air pumps which is laborious and expensive. Nor are they operated or designed to be used in co-operation or conjunction with the present form of windshield wipers. I have discovered that satisfactory results cannot be attained by the fluid alone.

It is to be observed that the container 1 when located within hood H as shown, the cleaning fluid will be kept warm and will thus cause the windshield to be readily cleaned of frost or snow in cold weather. The container can be filled at any service station and is sufficiently large to hold enough fluid to be used in traveling from one station to another. The fluid used may be clean water which will serve for most uses. Any suitable cleaning or antifreezing liquids may be added to the water as conditions may require.

It is to be further observed that the tubes 2 and 3 may be of soft copper and of a size that can be easily formed and fixed in position in and on the motor driven vehicle. The invention can be put on any finished car, or it can be built into the car with all tubing concealed when the car is being constructed. The ejecting pipe 10 is not limited to be used on but one-half of the windshield, but may be extended the full width of the glass G as indicated at 10a where an additional windshield wiper is frequently used.

Having described my invention, I claim:—

1. In a windshield cleaner of the class described, the combination with a motor vehicle, of a fluid container supported in the proximity of the gas motor of said vehicle, said fluid container having tubular outlet means for conducting and ejecting the fluid therein onto the windshield glass of said motor vehicle, gas pressure supplied within said container through a one-way tubular connection from a cylinder or the exhaust of said gas motor, and means for applying and controlling said pressure within said container and the discharge of said fluid therefrom onto said windshield glass when required.

2. In a hydraulic windshield cleaner, the combination with a gas motor vehicle, of a fluid container, means for filling, draining and venting said container, said container located in the proximity of the gas motor of said vehicle a one-way tubular connection from the combustion chamber of said motor into said fluid container to supply a gas pressure therein, said container provided with an open tubular discharge through which to conduct and eject cleaning fluid from within said container onto the windshield glass of said vehicle, a check valve in said one-way tubular connection, and a control valve on said one-way connection with operative button and shaft connected with said control valve suitably located within reach of the driver of said motor vehicle.

BEN J. WEST.